US010286549B2

(12) United States Patent
Kilibarda et al.

(10) Patent No.: US 10,286,549 B2
(45) Date of Patent: May 14, 2019

(54) ADAPTABLE END EFFECTOR AND METHOD

(71) Applicant: Comau LLC, Southfield, MI (US)

(72) Inventors: Velibor Kilibarda, Bloomfield, MI (US); Bryan Finzel, Macomb Twp, MI (US); Michael R. Dugas, Brighton, MI (US)

(73) Assignee: Comau LLC, Southfield, MI (US)

( * ) Notice: Subject to any disclaimer, the term of this patent is extended or adjusted under 35 U.S.C. 154(b) by 175 days.

(21) Appl. No.: 15/378,298

(22) Filed: Dec. 14, 2016

(65) Prior Publication Data

US 2017/0173789 A1 Jun. 22, 2017

Related U.S. Application Data

(60) Provisional application No. 62/267,949, filed on Dec. 16, 2015.

(51) Int. Cl.
| | |
|---|---|
| *B25J 15/00* | (2006.01) |
| *B25J 9/16* | (2006.01) |
| *B25J 13/08* | (2006.01) |
| *B25J 15/04* | (2006.01) |

(Continued)

(52) U.S. Cl.
CPC ........... *B25J 9/1612* (2013.01); *B25J 13/085* (2013.01); *B25J 15/0028* (2013.01); *B25J 15/0033* (2013.01); *B25J 15/0047* (2013.01); *B25J 15/0061* (2013.01); *B25J 15/0475* (2013.01); *B25J 15/103* (2013.01); *B25J 19/023* (2013.01); *G05B 2219/39466* (2013.01); *G05B 2219/39486* (2013.01); *G05B 2219/39487* (2013.01); *G05B 2219/39496* (2013.01); *G05B 2219/39559* (2013.01)

(58) Field of Classification Search
CPC ...... B25J 9/1612; B25J 15/0028; B25J 15/02; B25J 15/0253; B25J 15/08; B25J 15/10; B25J 15/0033; B25J 15/0061; B25J 15/0475; B25J 15/103; G05B 2219/39466; G05B 2219/39486; G05B 2219/39487; G05B 2219/39496; G05B 2219/39559
USPC ............. 294/104, 197, 207, 202, 103.1, 115, 294/119.1
See application file for complete search history.

(56) References Cited

U.S. PATENT DOCUMENTS

| | | | | |
|---|---|---|---|---|
| 2,727,779 | A | * 12/1955 | Phillips | .................. B66F 9/183 294/119.1 |
| 3,239,263 | A | * 3/1966 | Farmer | ..................... B66C 1/48 294/114 |
| 4,657,470 | A | 4/1987 | Clarke et al. | |

(Continued)

FOREIGN PATENT DOCUMENTS

| | | | | |
|---|---|---|---|---|
| CA | 2964199 | A1 * | 3/2016 | .......... B25J 15/0206 |
| EP | 1488893 | A2 * | 12/2004 | ............ B25J 9/1697 |

(Continued)

*Primary Examiner* — Gabriela M Puig
(74) *Attorney, Agent, or Firm* — Young Basile Hanlon & MacFarlane, P.C.

(57) ABSTRACT

An adaptable end effector useful to accommodate a wide variety of components, component geometries and variations in component geometries. In one example, the end effector includes a movable arm and at least three fingers each having a gripping tool for engagement of the component with variable and/or programmable holding force preventing relative movement.

17 Claims, 15 Drawing Sheets

(51) Int. Cl.
   *B25J 15/10*   (2006.01)
   *B25J 19/02*   (2006.01)

(56) References Cited

U.S. PATENT DOCUMENTS

| | | | |
|---|---|---|---|
| 4,697,838 A * | 10/1987 | Hartman | B25J 9/1015 |
| | | | 294/115 |
| 4,996,753 A | 3/1991 | Jones | |
| 5,172,951 A * | 12/1992 | Jacobsen | A61F 2/588 |
| | | | 294/104 |
| 5,308,132 A | 5/1994 | Kirby et al. | |
| 5,765,975 A | 6/1998 | Hoffmann et al. | |
| 6,256,555 B1 | 7/2001 | Bacchi et al. | |
| 6,484,601 B1 | 11/2002 | Arrichiello | |
| 6,491,330 B1 | 12/2002 | Mankame et al. | |
| 6,560,949 B2 | 5/2003 | Grams et al. | |
| 6,637,340 B1 * | 10/2003 | Wilson | E01B 29/20 |
| | | | 104/2 |
| 6,678,581 B2 | 1/2004 | Hung et al. | |
| 7,712,808 B2 | 5/2010 | Hofmeister et al. | |
| 7,950,708 B2 | 5/2011 | Parnell | |
| 8,261,960 B2 * | 9/2012 | Kilibarda | B23K 37/04 |
| | | | 228/44.3 |
| 8,528,955 B2 | 9/2013 | Robinson et al. | |
| 8,651,543 B2 * | 2/2014 | Matsuoka | B25J 15/0023 |
| | | | 294/192 |
| 8,684,418 B2 | 4/2014 | Lin et al. | |
| 8,818,531 B2 * | 8/2014 | Kilibarda | G05B 19/41815 |
| | | | 700/19 |
| 8,843,221 B2 * | 9/2014 | Wang | G05B 23/0232 |
| | | | 700/79 |
| 2008/0267747 A1 | 10/2008 | DiBella et al. | |
| 2010/0180711 A1 | 7/2010 | Kilibarda et al. | |
| 2010/0241260 A1 * | 9/2010 | Kilibarda | B25J 9/1602 |
| | | | 700/95 |
| 2012/0267055 A1 * | 10/2012 | Rogalla | B25J 15/022 |
| | | | 157/1.24 |
| 2013/0090761 A1 * | 4/2013 | Sejimo | B25J 13/085 |
| | | | 700/245 |
| 2013/0325181 A1 | 12/2013 | Moore | |

FOREIGN PATENT DOCUMENTS

| | | | | |
|---|---|---|---|---|
| EP | 2363252 A1 | | 9/2011 | |
| FR | 2988636 A1 * | | 10/2013 | B25J 15/103 |
| JP | 52152069 A * | | 12/1977 | B25J 15/02 |
| JP | 54131254 A * | | 10/1979 | B25J 15/02 |
| JP | 54138271 A * | | 10/1979 | B25J 15/0253 |
| JP | H0839474 A | | 2/1996 | |
| JP | 2002370187 A * | | 12/2002 | B25J 15/0033 |
| JP | 2017136672 A * | | 8/2017 | B25J 15/08 |
| WO | 2011070773 A1 | | 6/2011 | |
| WO | WO-2013002268 A1 * | | 1/2013 | G01N 35/0099 |

* cited by examiner

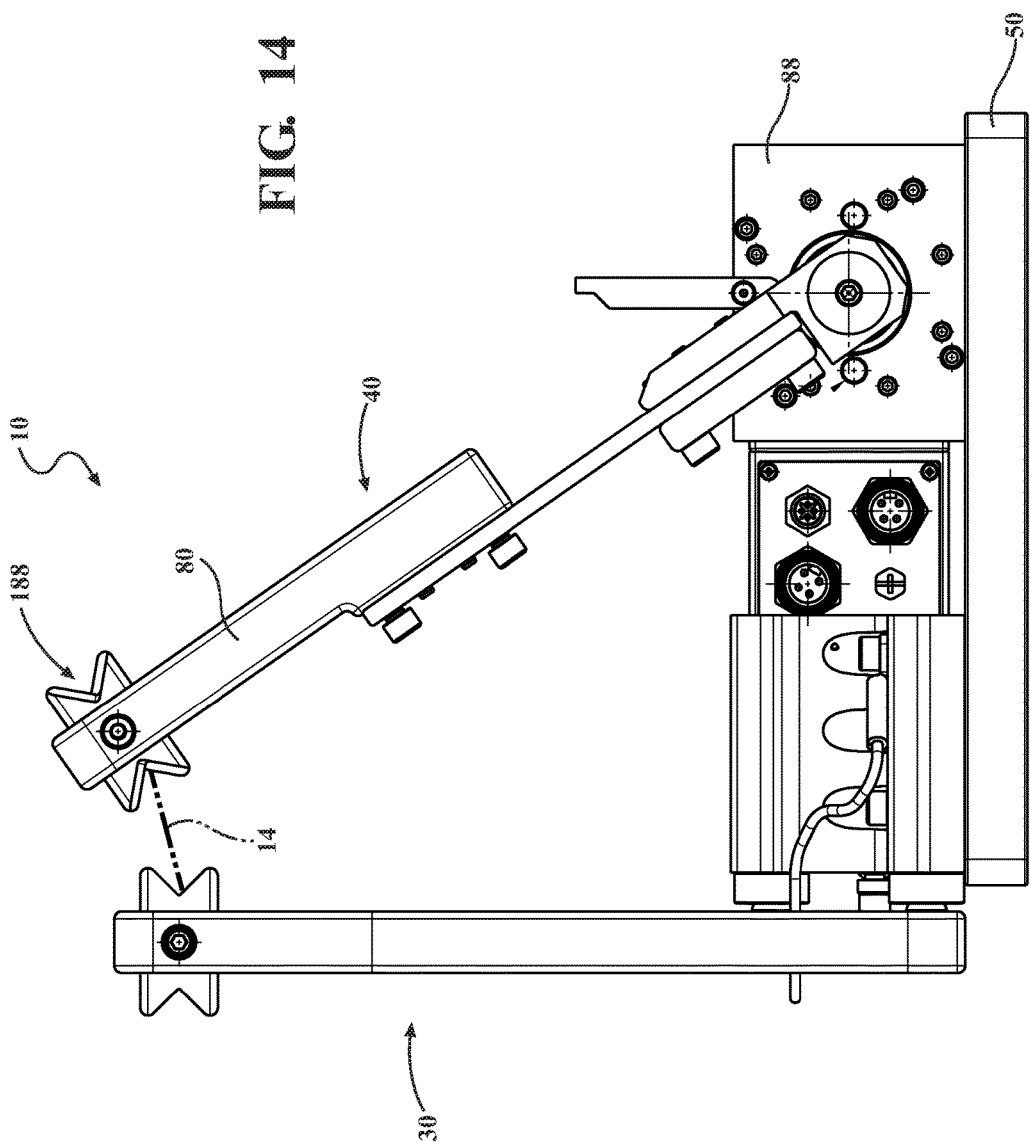

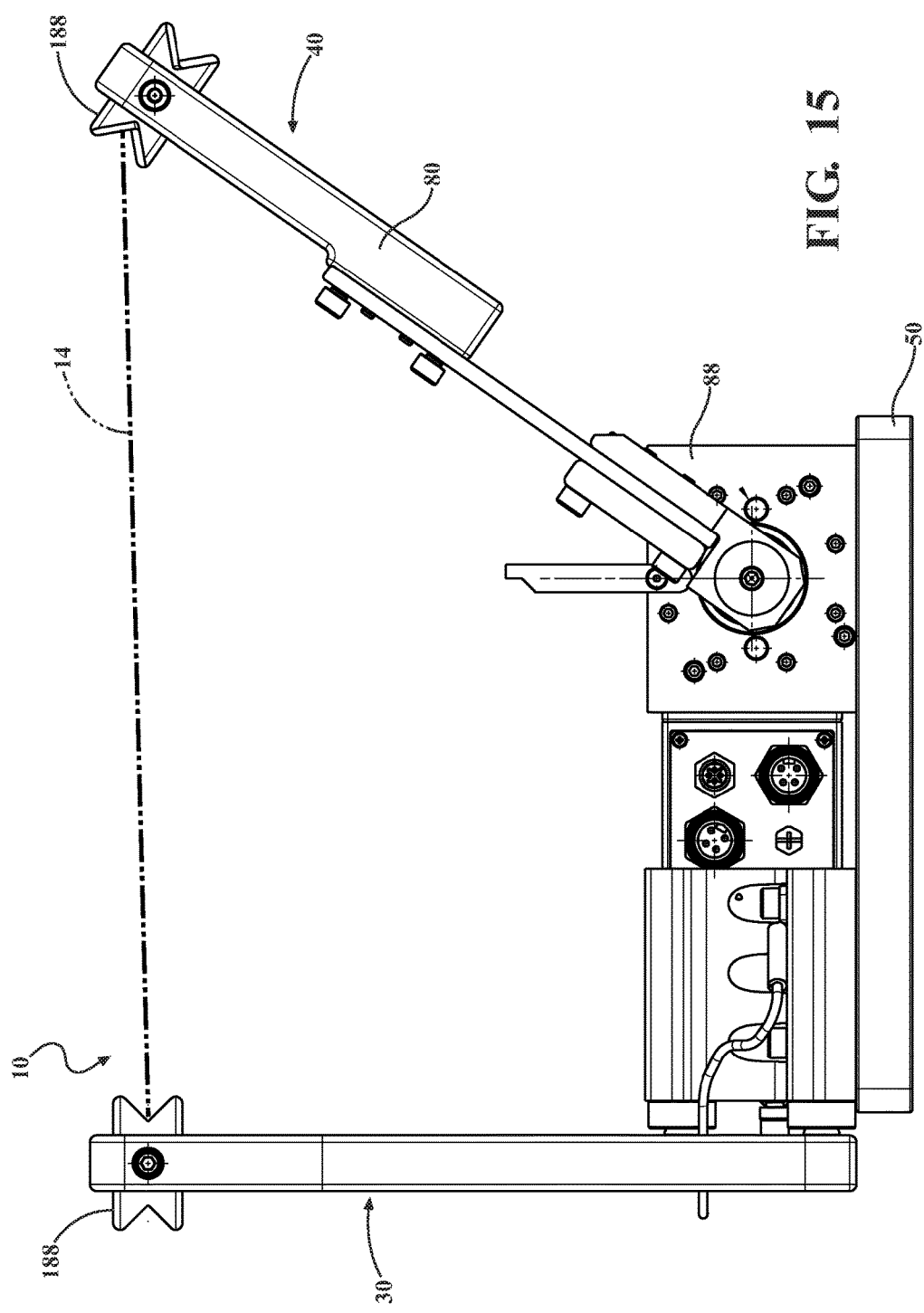

ADAPTABLE END EFFECTOR AND METHOD

CROSS-REFERENCE TO RELATED APPLICATIONS

This application claims priority benefit to U.S. Provisional Patent Application No. 62/267,949 filed Dec. 16, 2015 the entire contents of which are incorporated herein by reference.

TECHNICAL FIELD

The present invention generally pertains to automated assembly of products.

BACKGROUND

High volume assembly of products and vehicles typically employs automated assembly processes. In assembling large products, often industrial, multi-axis programmable robots are used to pick up, manipulate and position large components, for example sheet metal body assembly components, along an assembly line. These processes are also commonly carried out when assembling small devices as well.

In such automated assembly processes, conventional robots are positioned along various positions or assembly stations along an assembly line. Each robot is typically assigned and programmed to grasp a component or components and perform an assembly operation. An example robotic assembly operation may be grasping a sheet metal component from a storage rack, moving the component toward a holding fixture, reorienting or manipulating the component, releasing the component into a specific position in a welding fixture and repeating the process.

Each conventional assembly robot typically must include a tool or device commonly known as an end effector. A conventional end effector is a tool that connects to a robot wrist and receives power and actuating instructions from the robot processor and controller for controlling the timing and movement of the end effector according to the work the robot end effector is designed to accomplish, for example picking up and moving a component as described above. Conventional robotic assembly processes typically required a custom made or dedicated end effector for each robot according to the specific geometry of the component the robot was designed to grasp and manipulate. In a large assembly facility, this typically requires dozens, if not hundreds, of different end effectors which is very costly and time consuming to fabricate, install and maintain.

Additionally, if the assembly line alternates the type or model of products to be assembled, this often required shut down of the line to change many of the robot end effectors to accommodate the different component or assembly process. Alternately, complex and expensive tool changer devices must be used which disengage and set down one end effector and pick up another to accommodate the model assembly change. This changing of end effectors slows production cycle times and reliability of the device and assembly line. Conventional end effectors have been advantageous in high-volume "batch build" systems where high volumes of the same product are produced. These conventional end effectors are disadvantageous to "random build" assembly lines and facilities where several different versions or models of products are frequently interchanged to coincide with orders to meet customer demand.

BRIEF SUMMARY

The present invention includes an adaptable or flexible robot end effector which is flexible in the sense that it can accommodate or adapt to a large variety of different components and component configurations. In a preferred example, the adaptable end effector includes a two-arm, three finger grasping device. The exemplary device includes a first fixed arm having two fingers and a second movable arm having a single, third finger. The movable second arm allows the end effector to grasp a wide variety of different components, geometries and dimensional variations of the geometries without having to change or modify the end effectors.

In one example, the second moving arm over-travels to provide and maintain a suitable compression force on the component between the gripping fingers.

In one example, the fingers may include one or more pairs of rollers to engage the components and prevent translational movement of the component relative to the fingers. In an alternate example, fixed blade devices replace the rollers to engage the components.

In a preferred example, the end effector is a "smart" device that includes onboard hardware and programmable software which sets and adjusts the travel path of the movable second arm to accommodate the particular component to be manipulated or assembly operation. In one example, the end effector may receive instructions from a centralized assembly facility control system, for example when an entire assembly line is changed over to a different model or product altogether. The instructions may provide for a different length or stroke of movement to quickly adapt the end effector to grasp a different component to accommodate a change in the assembly process.

In one example, the adaptable end effector includes a vision device or system in electronic communication with onboard end effector controllers and actuators. The vision device may capture an image of a component the end effector is about to grasp and verify that the present end effector operating parameters, for example the set travel of the second movable arm, is appropriate for the particular component. Automatic adjustment of the set program may be made to accommodate the imaged component and/or safety protocols used to halt the operation if the imaged component does not match the end effector set or programmed operating parameters. Additional vision features or systems may include periodic imaging at important times in the end effector operation, for example, validating that the end effector has actually grasped a component and when the component is released.

In another example, the end effector may include a quick change arm whereby one or both of the arms can be quickly replaced to adjust the end effector to accommodate a different component or component geometry. In one aspect, one or both of the arms may be changed to accommodate a much larger or much smaller component geometry.

Other features and functions understood by those skilled in the art will be apparent after reviewing the following technical descriptions and drawings.

BRIEF DESCRIPTION OF THE DRAWINGS

The description herein makes reference to the accompanying drawings wherein like reference numerals refer to like parts throughout the several views, and wherein:

FIG. 14 is a left end view of the example shown in FIG. 13 showing the second movable arm in a position to grasp a small component; and FIG. 15 is an alternate left end view of the example shown in FIG. 13 showing the second movable arm in a position to grasp a large component.

DETAILED DESCRIPTION

Figure 1:
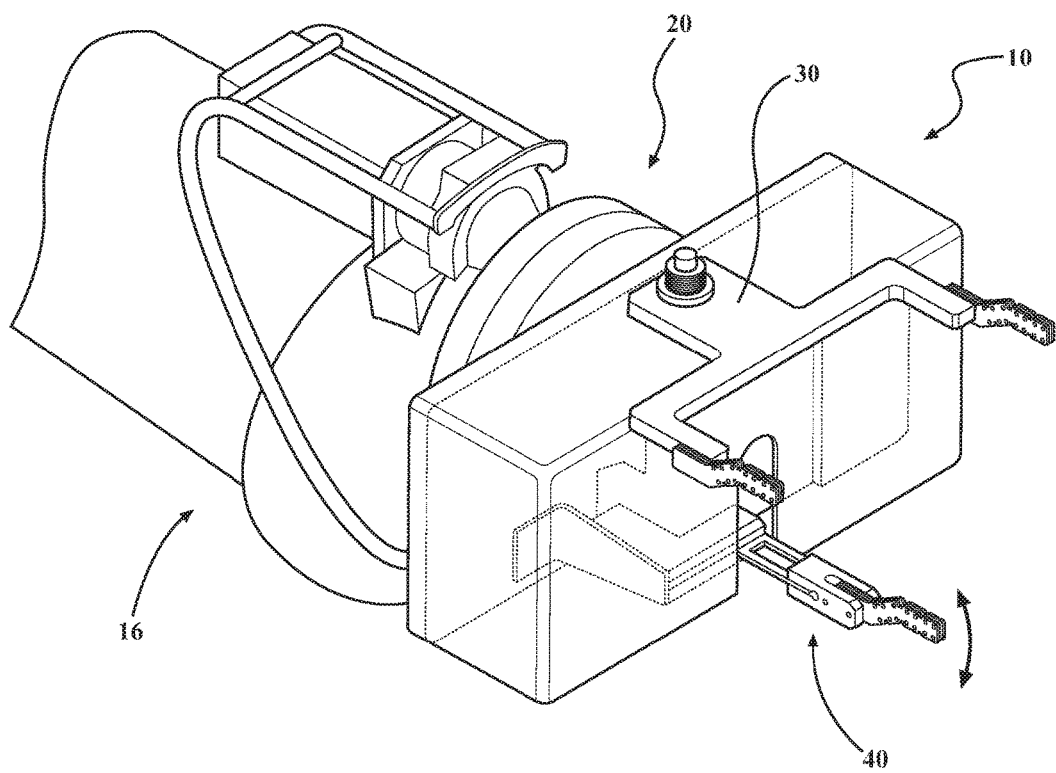
FIG. 1 is a perspective view of an example of a flexible end effector.
Figure 2:
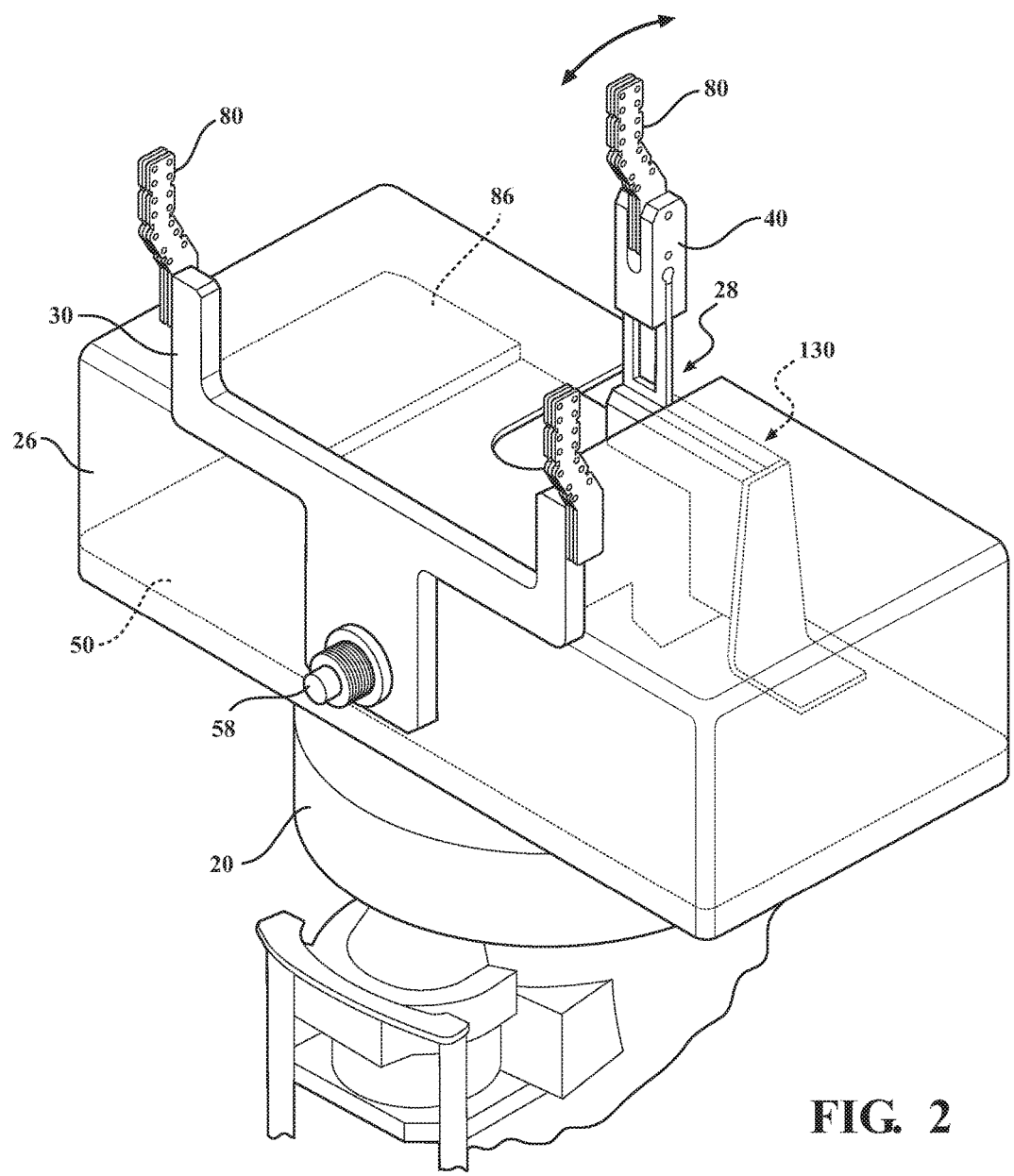
FIG. 2 is an alternate perspective view of the example shown in FIG. 1.
Figure 3:
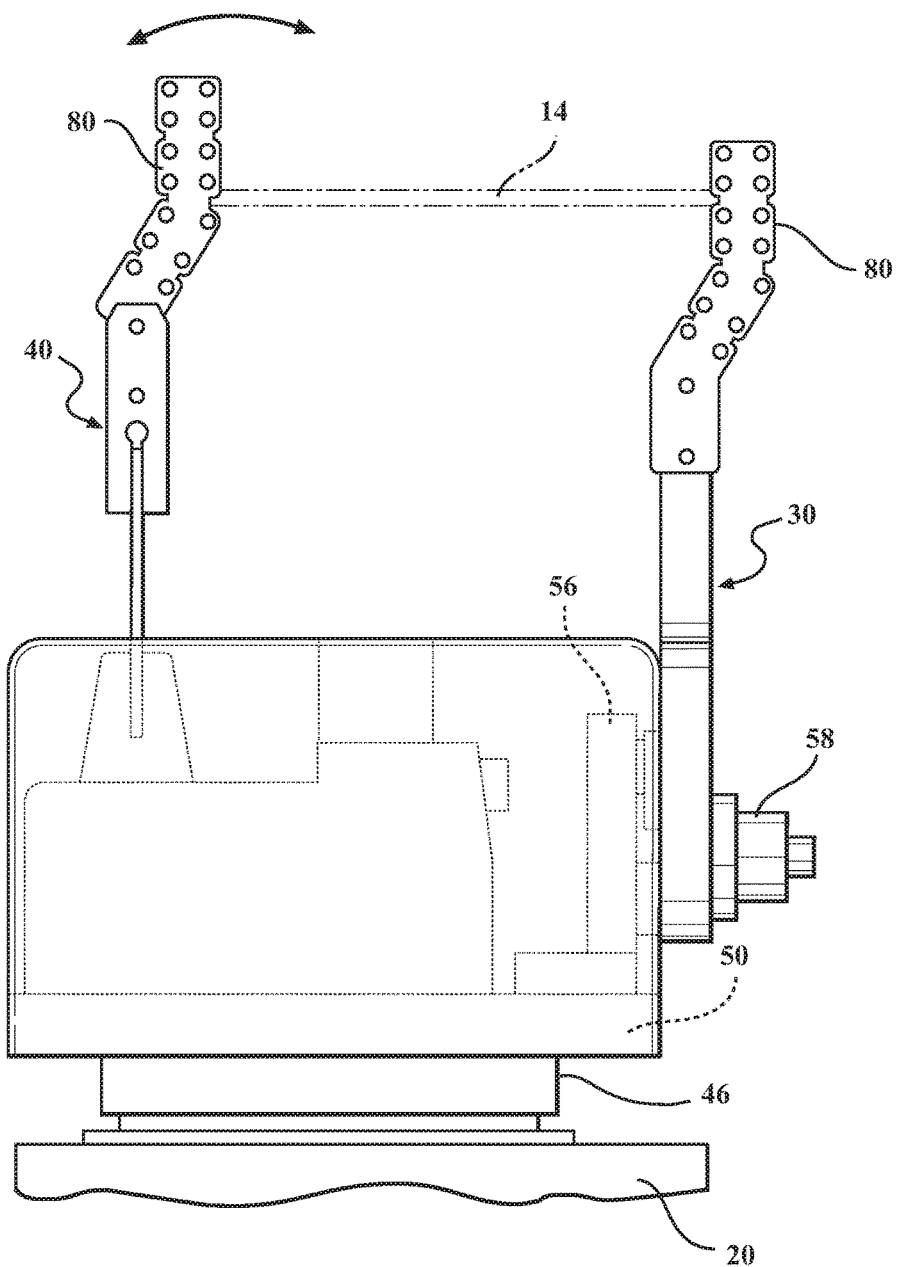
FIG. 3 is a right end view of the example shown in FIG. 1 rotated clockwise 90 degrees.

Examples of an adaptable or flexible end effectors 10 are illustrated in FIGS. 1-15 and described below. Referring to FIGS. 1-3, an example flexible end effector 10 is shown connected to a multi-axis programmable industrial robot 16 having a wrist 20 commonly used in high-volume assembly facilities. The end effector 10 is useful in exemplary applications for picking up or grasping, moving, manipulating in three-dimensional space, and releasing a wide range of components 14 (only one example shown) in a predetermined location, for example a welding fixture or other tooling. It is understood that end effector 10 can be used with devices other than programmable, multi-axis industrial robots.

In the example, end effector 10 includes a housing 26 having a slot or channel 28 in communication with an interior of the housing. Housing 26 is generally rectangular-shaped as shown, but may include other configurations, features and sizes to suit the particular application and performance requirements. Housing 26 may be made from aluminum, steel, composites or other materials suitable for the application and environment known by those skilled in the art.

Exemplary end effector 10 includes a first arm 30 and a second arm 40 extending outward from the housing 26 generally as shown. In a preferred example, first arm 30 is fixed in position relative to the housing 26 and second arm 40 is movable relative to first arm 30 as further described below. It is understood that first arm 30 could be movable and second arm 30 fixed in position (not shown). In one example not shown, both arms may be moveable relative to the housing and one another. It is further understood that more than two arms may be used.

Figure 4:
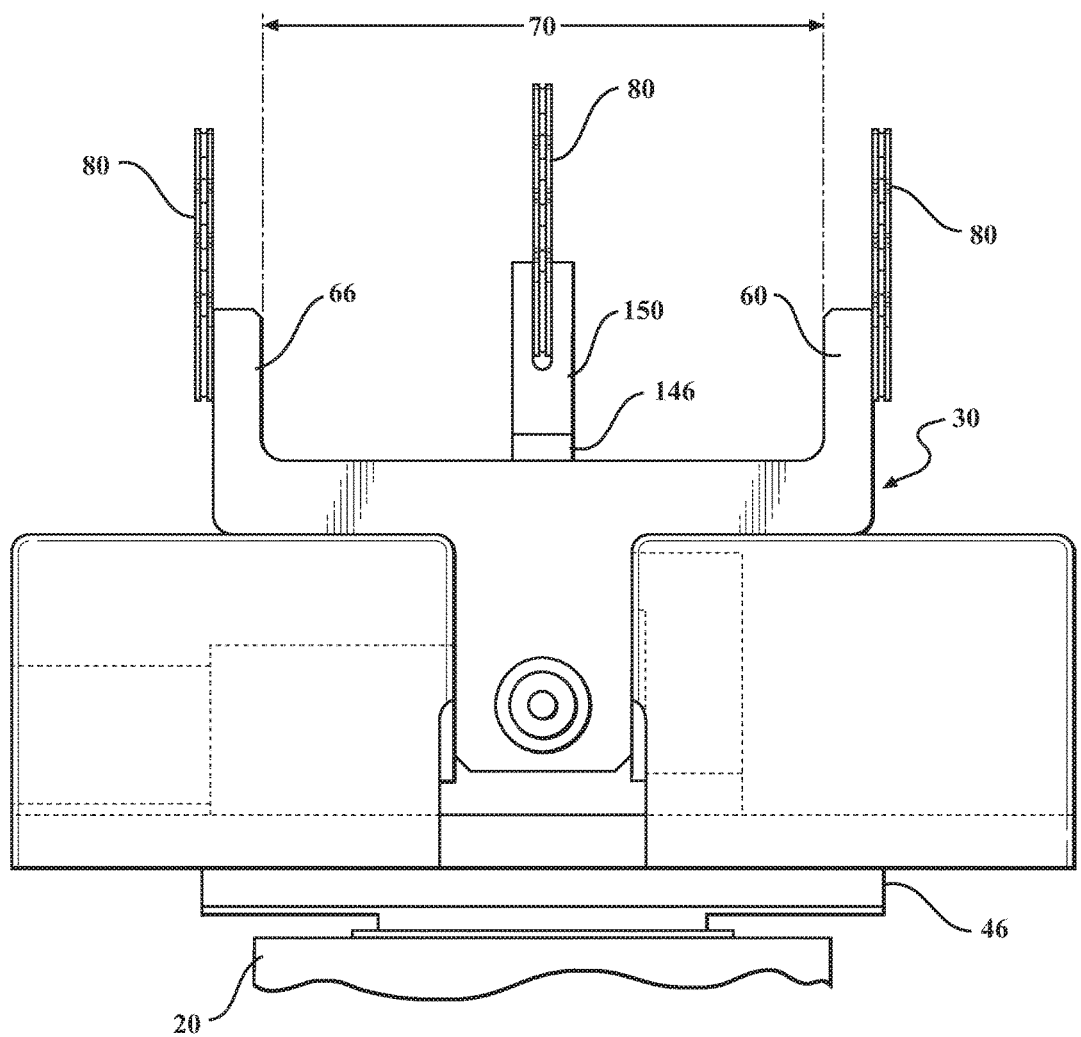
FIG. 4 is a top view of the example shown in FIG. 1.
Figure 5:
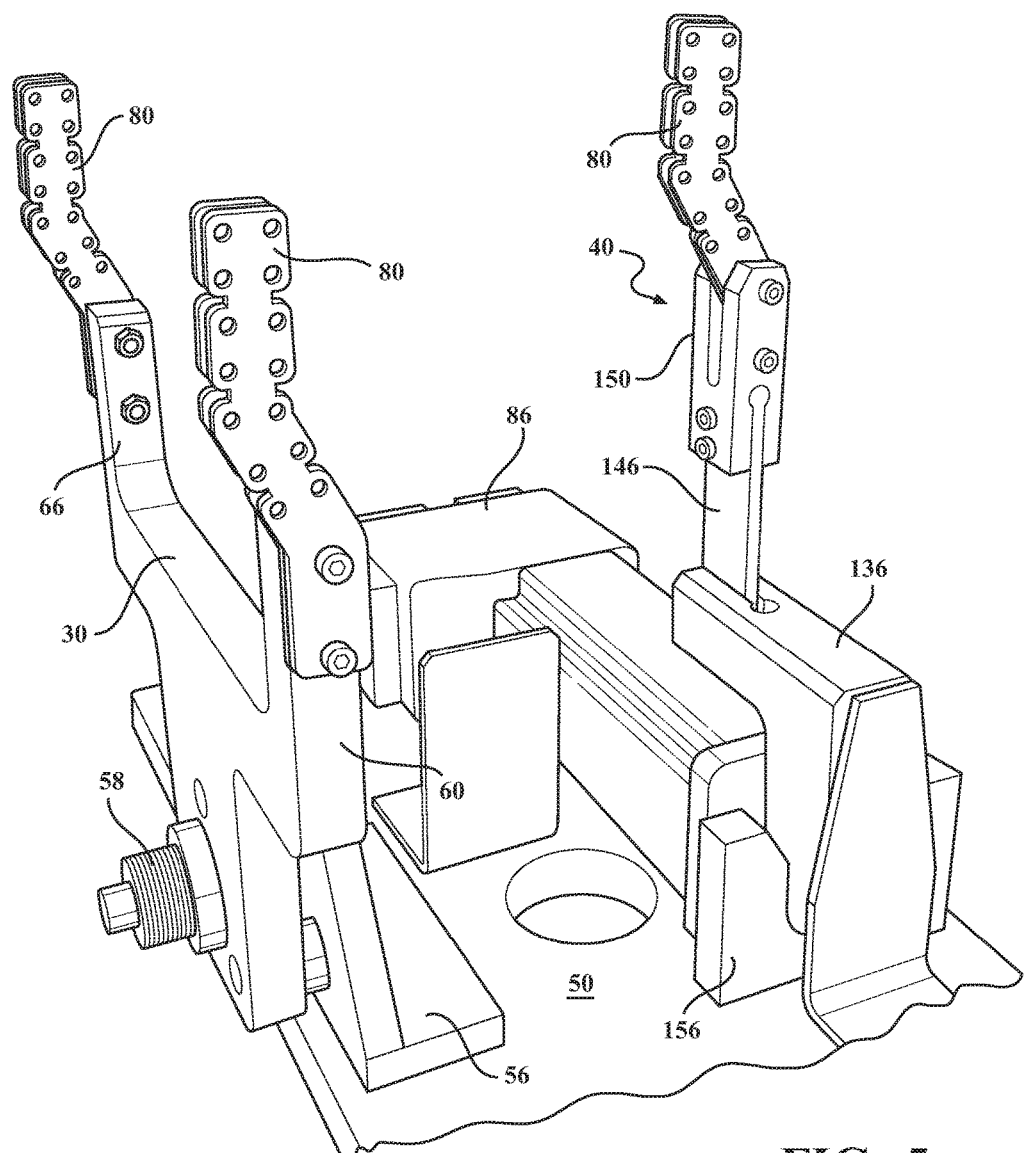
FIG. 5 is an example of a flexible end effector shown without a housing.

As best seen in FIGS. 3, 4 and 5, exemplary end effector 10 includes a rigid mounting plate 46 having suitable mounting features (not shown) for connecting to common industrial robot wrists. The mounting plate includes features (not shown) for routing electrical power, digital data communication cables and other service lines, for example pneumatic and hydraulic, to provide power to the end effector 10 and provide the necessary service items for the particular application. In a preferred example, only a power and data cable connection is necessary to provide electricity and data between the end effector and the robot. In an example not shown, other service lines may include cooling lines to control the temperature of the end effector or selected components therein. Other connectors, mounting plates and services lines known by those skilled in the art may be used.

In the example, end effector 10 includes a base plate 50 for mounting and supporting the end effector components further described below. Base plate 50 is preferably a rigid material, for example aluminum or steel, but may be made from other materials, for example composites, to reduce weight and to suit the particular application and performance specifications. In one example, mounting plate 46 may be integral with base plate 50. Although a single end effector 10 is connected to robot 16, it is understood that more than one end effector 10 may be simultaneously connected to robot wrist 20 depending on the size and orientation of the end effectors and application processes.

Exemplary end effector 10 includes a support 56 mounted inside housing 26 and rigidly connected to the base plate 50 as generally shown. As best seen in FIG. 3, first arm 30 is rigidly and fixedly connected to support 56. In a preferred example, the connection of the first arm 30 to the support 56 includes a break-away connector 58. The break-away connector 58 is pre-tensioned or pre-stressed through spring washers and a bolt with localized reduced diameter and functions to fracture on a predetermined impact force to first arm 30 to avoid undue damage to the first arm 30 and end effector 10. An example of a suitable breakaway connector 58 may be found in U.S. Pat. No. 8,261,960 assigned to the assignee of the present invention and incorporated by reference herein. On an inadvertent or unintended severe force or impact to first arm 30, break-away connector 58 fractures to absorb the impact. A replacement break-way connector can be installed to re-mount first arm 30 to support 56 re-establishing service of flexible end effector 10. Other suitable break-away or other connections known by those skilled in the art may be used.

In the preferred example shown in FIGS. 1, 2 and 4, first arm 30 is generally U-shaped having a first portion 60 and a second portion 66 separated by a distance 70 as best seen in FIG. 4. First arm 30 can have greater or fewer portions and alternate configurations and sizes to suit the particular application and performance specification. For example, the first or second portion may be longer or shorter than the other portion and may be curved or angled versus extending straight as generally shown. First arm 30 is preferably rigid and made from aluminum, but other materials such as steel or composites known by those skilled in the art may be used.

In one example not shown, first arm 30 can be readily changed with an alternately configured arm portions 60 and 66 and/or fingers 80 to accommodate different components 14 or component configurations. In one example, a replacement first arm 30 may include first 60 and second 66 portions that have a wider or narrower distance 70 between them (as shown in FIG. 4). In other examples (not shown) the portions 60 and 66 can be in alternate planes and/or different elevations for different applications and components 14. Alternate or replacement second arms 40 and associated finger 80 may also be installed in a similar manner.

Each of the first 60 and second 66 portions include a finger 80 further described below. Although described as rigidly fixed, it is understood that first arm 30 may be movable or have another mechanical connection to support 56 or plate 50. It is further understood that each arm 30 and 40 may have more or less portions (first arm shown with a first 60 and second 66 portion) and different shapes and configurations than as shown to suit the particular application and performance specifications as known by those skilled in the art.

Figure 6:
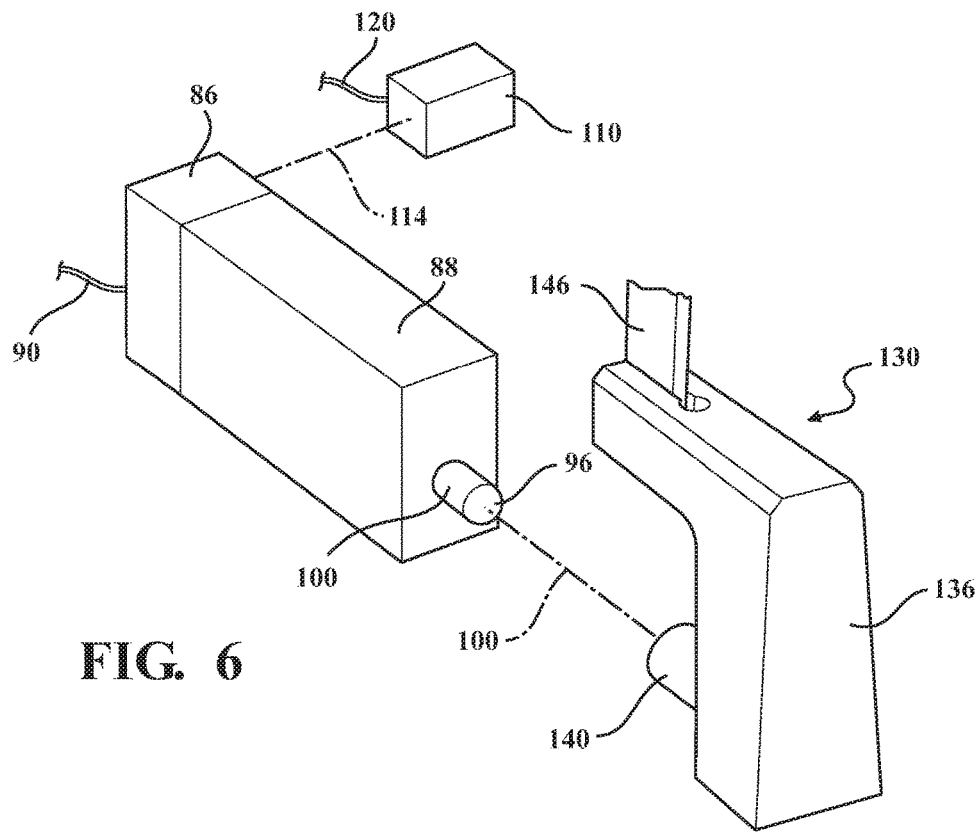
FIG. 6 is a schematic exploded view of a portion of the example flexible end effector shown in FIG. 5.
Figure 7:
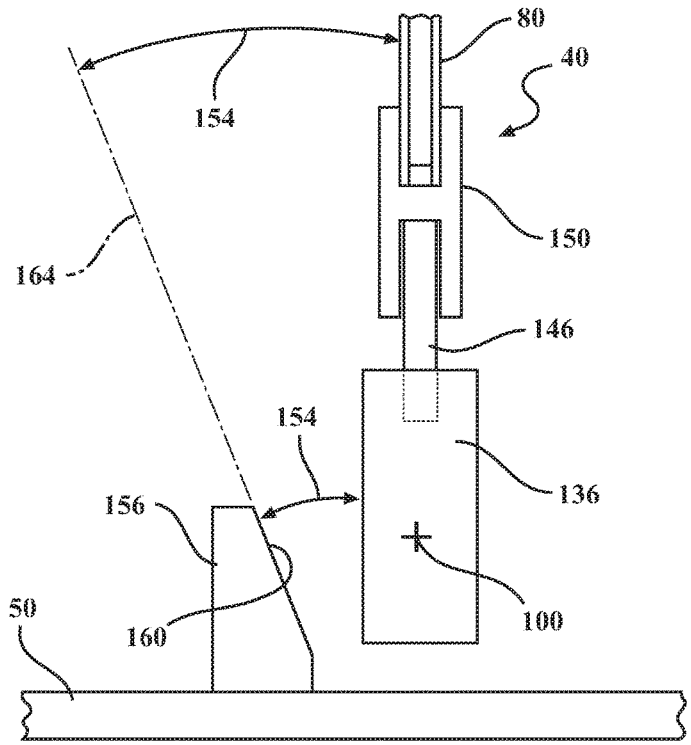
FIG. 7 is schematic end view of a portion of the armature of the flexible end effector shown in FIG. 5.

Referring to FIGS. 5, 6 and 7, exemplary adaptable end effector 10 preferably includes a drive device in the form of an actuator 86 and a motor 88 mounted to base plate 50. Motor 88 is connected to a power source through an electrical line 90 and includes a rotatable shaft 96 having an axis of rotation 100. In the illustrated example, motor 88 is in electronic communication with an actuator 86 as generally shown. In one example, motor 88 is an electrical servomotor. Although motor 88 is shown as providing rotational motion through shaft 96 to second arm 40, it is understood that alternate motors or drive device systems may be used which impart linear, circular, elliptical and other translational movements to second arm 40. Alternate drive systems may include pneumatic, hydraulic, magnetic or other controlled forced movement devices to suit the particular application, environment and performance specifications.

Exemplary actuator 86 is preferably placed in electronic and/or digital communication with a control unit 110 through a data link 114 or other electronic or digital cable schematically shown. In one example of a "smart" end effector 10, control unit 110 includes a power supply 120, a central processing unit (CPU) capable of process or manipulate information, a programmable controller, memory storage device which may include read only memory (ROM) and random access memory (RAM) for storage of data or executable instructions, input and output devices, communication hardware, for example wireless data signal receivers and transmitters (not shown) in selective data communication with one another. Operating system and preprogrammed software are stored in the memory storage device, for selectively executing preprogrammed instructions to the actuator 86 to direct the motor 88 and the end effector second arm 40 to perform a predetermined operation. Other hardware, software and other components known by those skilled in the art may be used.

The adaptable end effector 10 preprogrammed operation system and software may also include instructions to operate and control the industrial robot 16.

In a preferred example, end effector control unit 110 has preprogrammed (or programmable) software and instructions to execute predetermined and timed movements of the robot 16 and end effector 10 for the one or more assembly or other operations. For example, the control unit 110 may have instructions for one or more predetermined 3-dimensional paths of travel for the robot 16 to follow for several specific assembly operations including a specific component 14, for example to accommodate two, three or more different vehicle bodies that may be built along a particular assembly line during a work shift.

The adaptable end effector 10 control unit 110 may include predetermined instructions that are specific to an assembly operation and/or specific component 14. For example, the preprogrammed and stored instructions for a specific component may execute the movement of the end effector 10 second arm 40 to grasp a specific component 14 or component configuration to accommodate the exemplary different vehicle bodies being assembled in an assembly facility. For example, the preprogrammed instructions for the operations of the end effector 14 for a specific component 14 may include the 3-D coordinate location positions x,y and z of end effector 10 and/or the fingers 80; paths of travel of the robot and/or end effector 10; energizing and movement of the drive device, for example motor 88, to move second arm 40 a predetermined angle or travel to close or open second arm 40 to grasp or release component 14; force ranges, for example how much force fingers 80 are to apply to the component 14, and time periods (seconds) between the operations that are appropriate or coincide with the predetermined movements and/or operations that end effector 10 executes with respect to component 14. In one example, a plurality of different program instructions specific to a plurality of respective different components 14 can be preprogrammed and stored in control unit 110.

This adaptability of end effector 10 to adjust, in process, to a specific component 14 or assembly operation is particularly advantageous where, for example, four different vehicle models or products are built along the same assembly line including end effector 10. On sensing or receiving a signal that a particular vehicle model is presently being assembled, the proper instructions to grasp and/or manipulate a specific component 14 for that particular vehicle can be recalled from the memory storage device and executed by the processor to initiate the appropriate operations and movements of end effector 10 and second arm 40 for that specific component 14 for the specific vehicle or product being assembled. Recognition of the specific vehicle and the appropriate component 14 to presently be manipulated by end effector 10 may be from an imaging or sensing device connected to the end effector which, for example, may scan or image a fixture, pallet, or identification indicia thereon, that has transitioned into the assembly station for work. Alternately, wireless or hardwired signals of the component, vehicle or product being built may be pushed to, or received by, the end effector 10 from an upstream sensing device in the assembly station or from a central control area in the assembly plant. Other devices and methods for signaling a robot or end effector 10 of the present or proper assembly operation known by those skilled in the art may be used.

In an alternate example, the end effector control unit 110 can receive signals and instructions from a central control unit (not shown) through hard wire or known wireless communication protocols for more dynamic and rapid changeover to an assembly line or re-tasking of the robot 16. These programmable instructions stored in the flexible end effector control unit 110 can be manually programmed/stored in the control unit 110 by a technician or received from a central control station remotely positioned in the assembly facility or remote from the assembly facility. Examples of suitable "smart" end effectors and communication systems can be found in US Patent Application Publication Nos. 2010/0180711A1 and 2010/0241260A1 and U.S. Pat. Nos. 8,843,221 and 8,818,531 all incorporated herein by reference.

In an alternate example not shown, end effector 10 can receive data instructions and executable functions from the robot 16 controller and through other ways similar to conventional systems.

Referring to FIGS. 5-7, adaptable end effector 10 preferably includes an exemplary armature 130 connected to the motor shaft 96 through a mating connector 140. Shaft 96 and connector 140 are aligned along axis of rotation 100 and are preferably a complimentary male and female connection combination which prevents relative rotation between 96 and 140. This may be in the form of a spline-type or other coupling configurations allowing for rotation in both clockwise and counterclockwise rotation while preventing relative rotation known by those skilled in the art. In one example not shown, the coupling between the shaft 96 and connector 140 may have a shock absorbing insert or other feature which allows a predetermined cushion or energy absorption between shaft 96 and connector 140 to, for example, apply a compressive force by second arm 40 finger 80 on a held component 14 as further described below. Suitable shock absorbers for this type of coupling are identified as Motion Control devices sold by Lovejoy Coupling Solutions.

Figure 8:
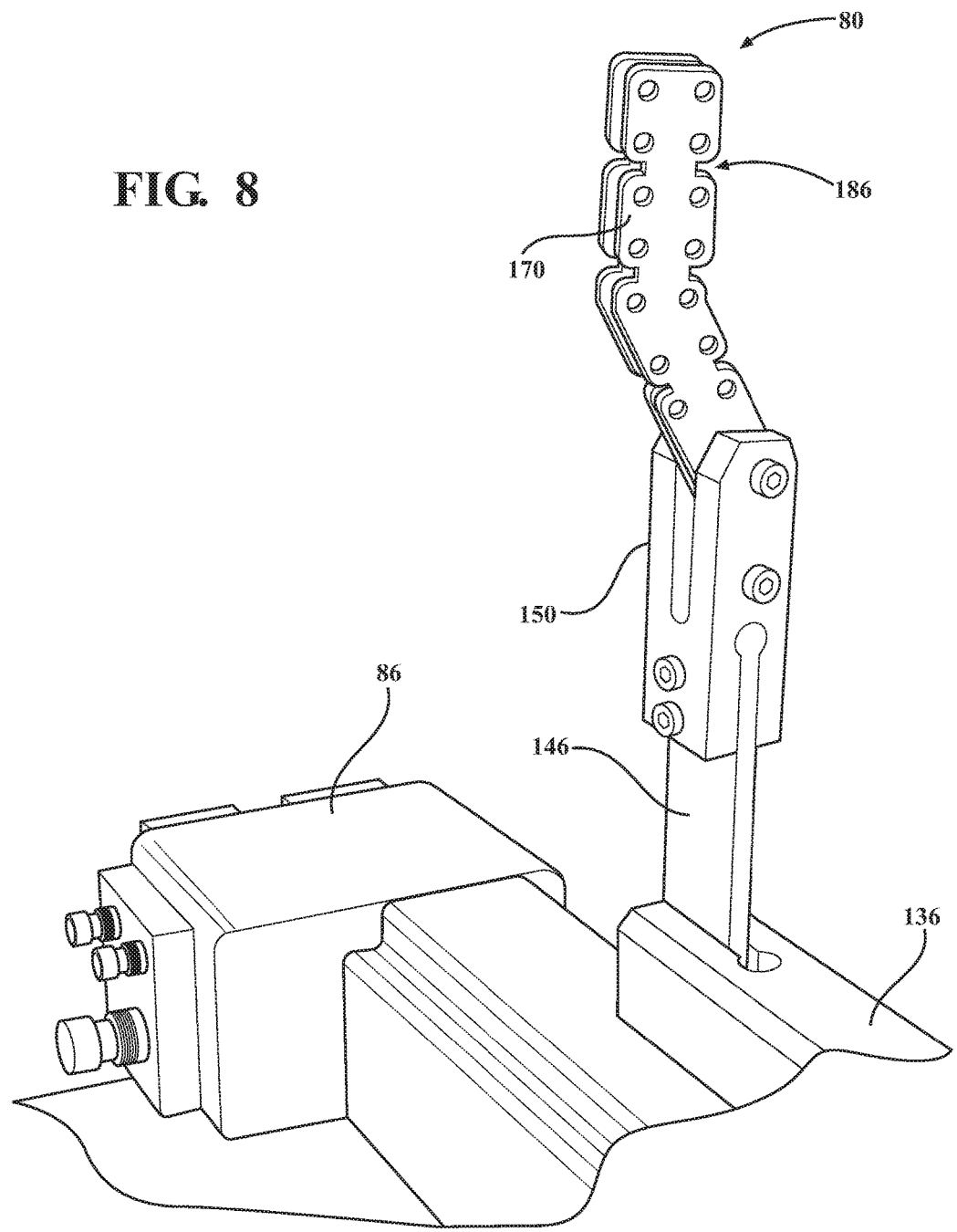
FIG. 8 is a side perspective view of a portion of the movable arm example shown in FIG. 5.

As best seen in the examples shown in FIGS. 6, 7 and 8, movable second arm 40 armature 130 includes a base 136. Base 136 rotates about axis 100 on rotation of shaft 96. Base 136 may be made from aluminum, other non-ferrous or ferrous metals and other materials known by those skilled in the field. Base 136 may also take other shapes and configurations suitable for the particular drive device used, application and performance specifications.

In the example shown in FIGS. 5 and 6, end effector 10 includes a stop 156 having an angled surface 160 facing toward armature 130. In a preferred mode of operation, angled surface 160 serves as an abutment surface for base 136 defining a maximum angle of rotation of base 136 and second arm 40 in the direction of first arm 30. A resilient or cushioning member (not shown) may be applied to or between angled surface 160 for contact with base 136. For example, a spring device (not shown) may be positioned between base 136 and stop 156 to aid in the travel and application of a compressive force of second arm 40 on component 14.

As best seen in FIGS. 2 and 7, on actuation by control unit 110, armature 130 and second arm 40 rotate about axis 100 from an open/non-grip position to a predetermined closed/grip position 164 along path of travel 154. Slot 28 in housing 26 provides relief for second arm 40 to rotate toward first arm 30. In a preferred example, the predetermined closed/grip position 164 of second arm 40 is programmed and stored in the control unit memory 110. For example, if the assembly process specifies robot 16 will pick up a vehicle door panel for vehicle model A, the end effector 10 rotational open and closed/grip positions of movable arm 40 will be programmed and stored in control unit 110 (or data transferred from a broader or assembly plant control system (not shown)). On actuation of movable arm 40 by actuator 86 and motor 88, second arm armature and finger 80 will move along the path of travel 154 to the predetermined rotational position, for example 164, which will place second arm 40 finger 80 into engagement with component 14.

The predetermined position 164 of second arm 40 is preferably a position where component 14 is physically engaged with all three fingers 80 and respective rollers 190 and 200 (or whatever component engagement device is used). In a preferred example, the predetermined position 164 will provide an interference fit and apply a predetermined force on the component 14. In other words, in a preferred example, the predetermined position 164 will be a position a few degrees more than necessary for first contact to ensure secure engagement of the component 14 and apply a compressive force on the component through the fingers 80 (assuming a pinching form of movement by fingers 80). On use of other arm drive systems, for example a linear versus rotational movement, a similar over-travel operation to ensure secure engagement of the end effector 10 to component 14.

Although the exemplary movement of second arm 40 is described as moving toward first arm 30 in a pinching action, it is understood that second arm 40 can move away from first arm 30 to grasp a component 14. For example, fingers 80 on both the first 30 and the second 40 arms may be positioned in an interior hole in a component. Movement of armature 130 to move second arm 40 away from first arm 30 may be used to grasp the component versus grasping an exterior perimeter of a component 14. It is further understood that predetermined position 164 can be at any point along a path of travel 154 to suit the particular application, for example see FIGS. 14 and 15.

In an alternate example end effector 10, preprogrammed and stored rotational positions 164 for different components 14 are not used. Alternately, second arm 40 predetermined positions 164 along path of travel 154 are determined based on engagement and force applied to the component 14. For example, internal force sensor(s) or servo motor feedback may be used to signal control unit 110 and actuator 86 to stop rotating (or moving) second arm 40 when a detected force reaches a certain level. For example, once the end effector first arm 30 is placed in a predetermined position with respect to the component 14, second arm 40 is rotated until a sensor detects that a certain force threshold has been met and then ceases further movement of second arm 40. Once the threshold force is achieved, there is confidence that a component 14 has been grasped and engaged with the fingers 80. This alternative provides for a less complex end effector which would not require, but still may be used with, vision systems described below. There are many force sensors and systems, for example monitoring of current or voltage of motor 88 to determine torque applied, known by those skilled in the art which may be used. It is understood that in this example, and the others identified herein and known by those skilled in the art, the force applied by the second arm 40 (or first or both arms, and as otherwise described herein) to the component 14 may be varied for component 14 to component 14 through preprogrammed instructions in the control unit 110, through the sensors (vision, force) described herein or in other ways known by those skilled in the art.

Referring to FIGS. 5, 7 and 8, exemplary movable second arm 40 includes an extension 146 secured to armature base 136 through conventional fasteners or other methods known by those skilled in the art. Extension 146 may be a rigid member, for example steel, or have a predetermined level of resiliency or spring-back quality, for example spring steel, in order to impart a compressive force on a grasped component 14 further discussed below.

Exemplary second arm 40 further includes a connector or clevis 150 which connects a grasping finger 80 as best seen in FIG. 8. Clevis 150 provides a secure connection between the extension 146 and finger 80. Other connectors and devices for mounting finger 80 to armature 130 may be used by those skilled in the art. As noted, a spring or resilient device (not shown) may be included in this connection to assist in application of a compressive force on component 14 or otherwise assist in the end effector gripping the component 14. It is understood that although fingers 80 are shown as separate and distinct components from first 60 and second 66 portions, extension 146/clevis 150 and fingers 80 may be integral or unitary to the portions 60/66, or extension 146, or may include additional components depending on the application and performance requirements.

Figure 9:
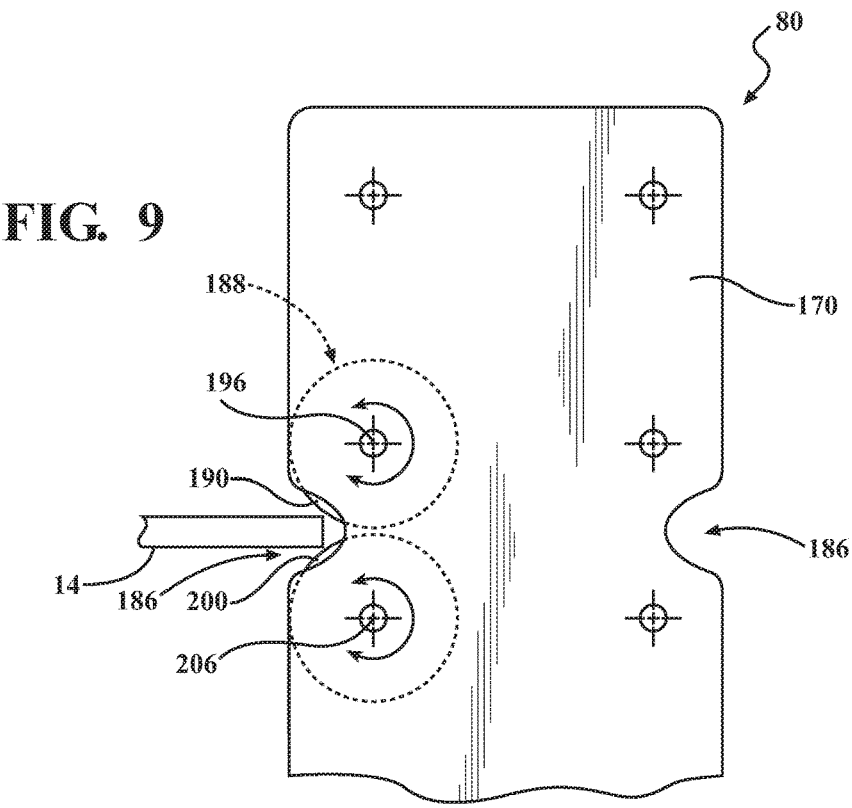
FIG. 9 is a schematic of an enlarged portion of an example of a grasping finger shown in FIG. 8 including rollers gripping a component.

Referring to FIGS. 5, 8, 9, 10 and 11, the preferred first arm 30 first 60 and second 66 portions and second arm 40 each include a finger 80 as generally shown (three fingers 80 shown). As best seen in FIGS. 8-11, a preferred finger 80 includes a first plate 170 and a second opposing plate 176 positioned in substantial parallel orientation and separated by one or more spacers 180 to keep the plates a desired distance apart and oriented. As shown, the first 170 and second 176 plates include a plurality of guide areas or notches 186 positioned along a length of the finger 80. Guides 186 are positioned and sized to serve as guides or bumpers to urge components 14 to be grasped, for example a single thickness spot welding flange on a sheet metal vehicle body component, deeper into the guide for contact and/or direct engagement as discussed further below. As shown in FIGS. 8 and 9, the guides 186 in the respective plates 170,176 in a particular finger 80 are preferably aligned across the finger 80. As shown in FIG. 8, guides 186 are preferably positioned on both sides of each plate 170 and 176. This allows for fingers 80 to pinch a component 14 by applying a force from a perimeter toward the interior of a component 14 (as shown in the illustrations) as well as a applying a force from the inside of a component toward a perimeter of the component (for example fingers 80 positioned inside a component 14 interior hole (or holes) and second arm rotating outward to grasp component 14). It is understood that more or less than three fingers 80 may be used to suit the particular application and performance requirements.

Figure 9A:
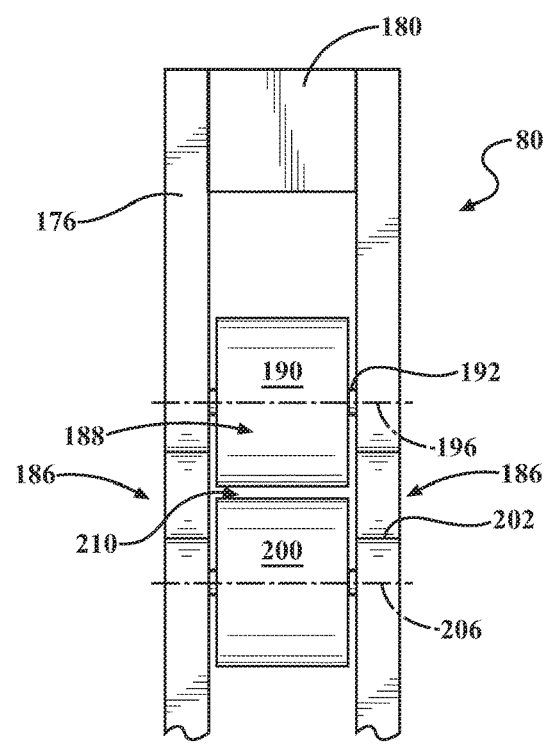
FIG. 9A is a schematic end view of the finger shown in FIG. 9.

As best seen in FIGS. 9 and 9A, a finger 80 includes an example of a component gripping tool 188. In a first example, gripping tool 188 includes a first 190 and a second 200 roller rotatably mounted between finger first 170 and second 176 plates on respective axles 192 and 202 for rotation about first 196 and second 206 axes of rotation (spaces and distances between the plates and rollers shown for ease of illustration only). As best seen in FIG. 9, first 190 and second 200 rollers are sized, positioned and mounted to partially extend into guides 186 for engagement of a component to be grasped 14 as generally shown. The distance 210, if any at all, between the first 190 and second 200 rollers may vary between applications depending on what type of assembly operation and/or the type of component 14 to be grasped and manipulated. In a preferred example, the rollers are preferably positioned with no, or only a minimal distance 210 apart forming a pinch or pinching point to grip/engage the component 14 and prevent lateral movement of the component 14 relative to the gripping tool 188 and fingers 80. The examples of gripping tool 188 and fingers 80 accommodate a wide variety of vehicle body sheet metal components of varying gauge or thickness, from approximately 0.5 millimeters (mm)-3.5 millimeters (mm) thick, so alternate fingers 80 do not have to be used for different vehicle bodies or components as the vehicle body builds vary throughout shifts, work days or work weeks in a high volume assembly facility. It is understood that greater or lesser distances 210, or no distance at all, may be used to suit the particular application. It is understood that different component 14 gauge/thickness of materials may vary greatly depending on the application and assembly process and does not deviate from the present invention. It is further understood that different finger 80 numbers (more or less than three as shown), construction, configuration and orientation may vary to suit the particular application and performance specification. It is further understood that gripping tool 188 structures other than rollers further discussed below, for example serrations on the first 170 and/or second 176 plates may be used to suit the particular application.

Referring to FIGS. 10 and 10A-C, an alternate finger 80 design is shown. In the example, gripping tool 188 is in the form of a single, fixed blade device 260 instead of rollers 190 and 200 previously described. In the alternate example blade device, blade 260 includes a body 264, a first edge 270 and a second edge 276 as generally shown. Each first 270 and second 276 edges include a first edge portion 272 and a second edge portion 274 angularly offset from the first edge portion 272. A mounting hole 280 is shown to secure the blade 260 to the finger 80 through mechanical fastener(s) as known by those skilled in the art.

Figure 11:
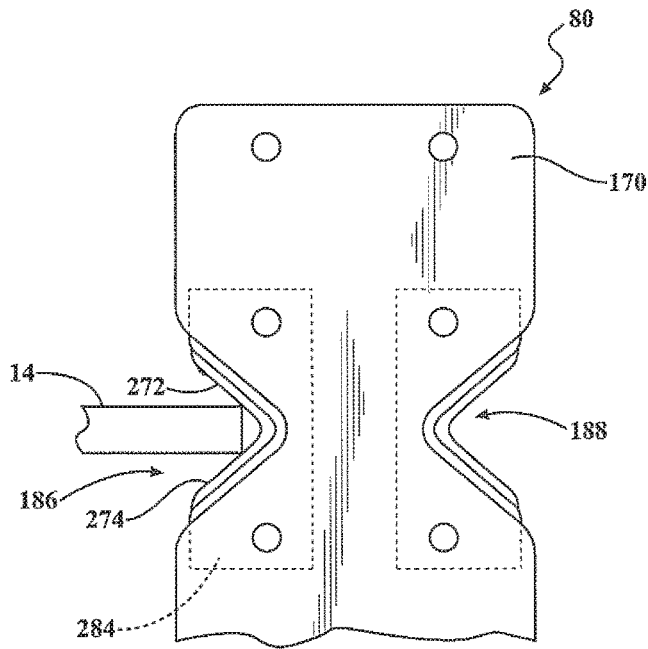
FIG. 11 is a schematic of an enlarged portion of the grasping finger shown in FIG. 8 with an alternate exemplary blade device gripping a component.
Figure 10A:
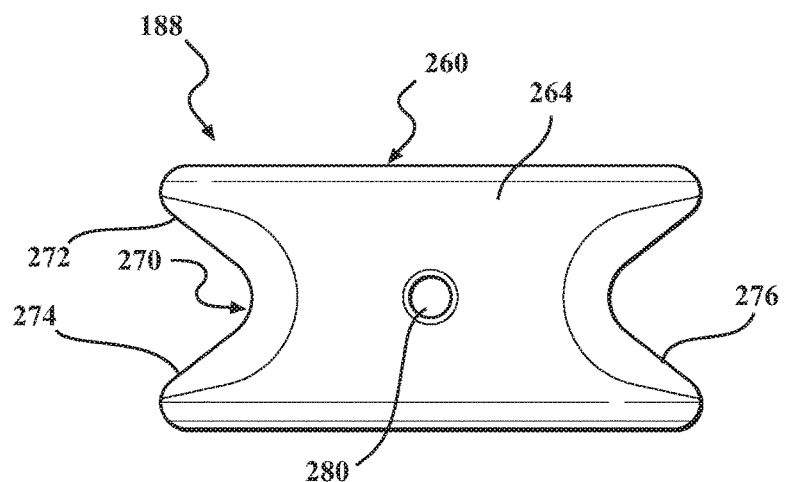
FIG. 10A is front view of the blade device in FIG. 10.
Figure 10B:
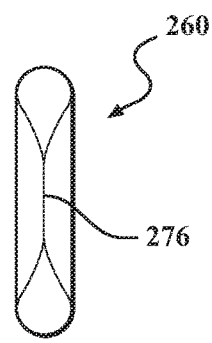
FIG. 10B is a right end view of the blade device in FIG. 10A.
Figure 10C:
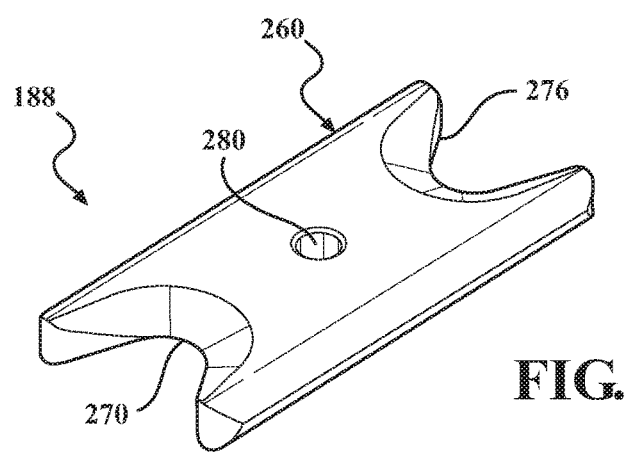
FIG. 10C is a perspective view of the blade device in FIG. 10.

In FIG. 11 an alternate gripping tool 188 blade design 284 is shown. In this example, blade 284 consists of a single insert for each guide opening 186 as generally shown.

Figure 13:
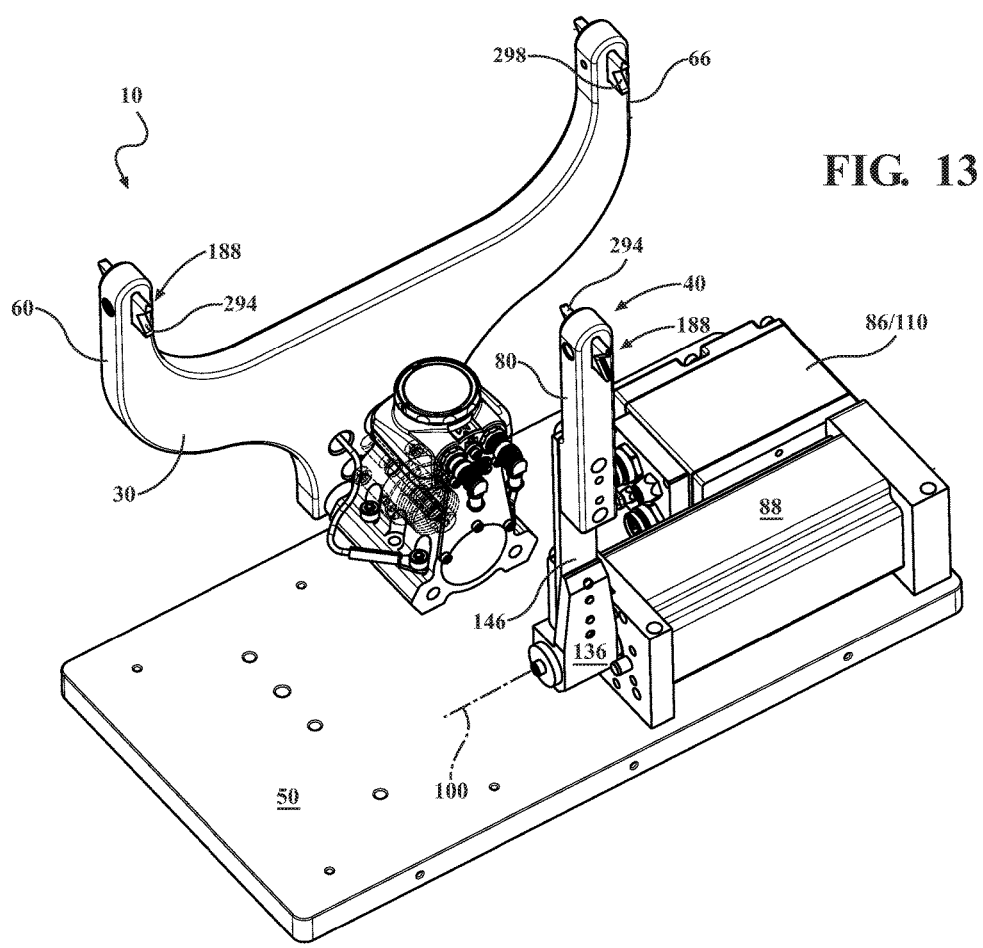
FIG. 13 is a front facing bottom perspective view of an alternate example of an end effector with the housing removed.

Referring to FIGS. 13, 14 and 15, an alternate example of first 30 and second 40 arms and gripping tools 188 are shown. In the example, first arm 30 integral first 60 and second 66 portions serve as the fingers and include removable gripping tools 188 which extend outwardly from the arms 30 and 40 as generally shown. In the example, gripping tools 188 take an alternate gripping tool blade 294 having an angled notch 298 for receiving and engaging a component 14 (not shown). Blade 294 may be secured to the respective arm with a fastener or by other securing devices known by those skilled in the art.

In the example, second movable arm 40 includes an alternate finger 80 including blade 294 as generally shown.

Figure 10:
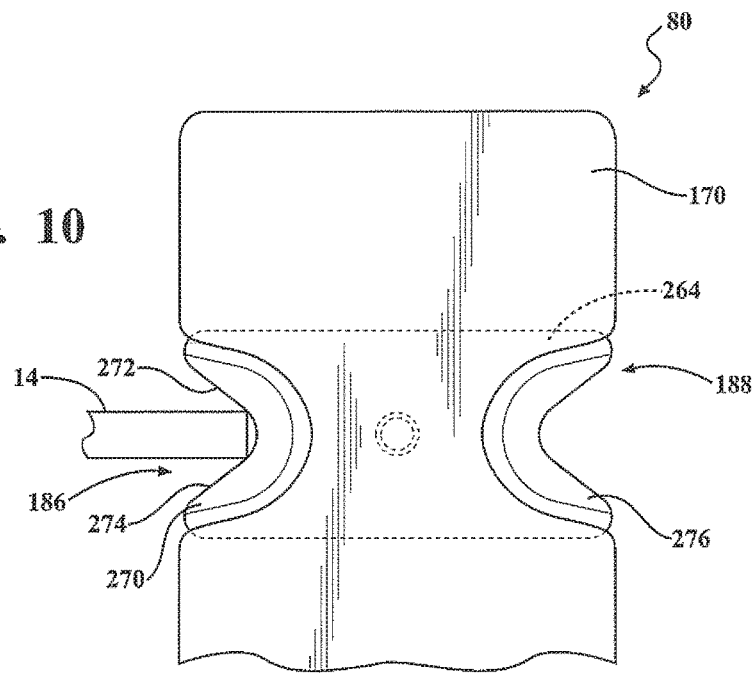
FIG. 10 is a schematic of an enlarged portion of an example of a grasping finger with an alternate exemplary blade device gripping a component.

As shown in FIGS. 10 and 11, alternate blades 260 and 284 are preferably connected to finger 80 between the first 170 and second 176 plates. Blades 260,284 and 294 may be made from hardened steel, tool steel or may be a combination of materials, for example a steel base and a carbide or other insert to form first 270 or second 276 edges for increased edge form and sharpness to engage component 14. It is understood that other blade body and edge shapes and configurations known by those skilled in the art may be used. It is further understood that gripping tool 188 can take other forms and configurations for engaging a component 14 than the exemplary rollers and blades illustrated and combined. It is further understood that although gripping tool 188 has been described as having separate rollers and blades inserted between finger plates 170 and 176, the gripping tool 188 features may be integral to plates 170/176, arms 20 and/or 30, or include other mounting and configuration schemes as known by those skilled in the art. An advantage of having gripping tools 188 as inserts mechanically attached to plates 170 and 176, or arms 20 or 30, is the ability to easily replace the gripping tool if damaged or worn versus replacing the entire finger 80.

As best seen in FIG. 5, the first arm 30 first and second portion fingers 80 are preferably positioned so that the respective guides 186 are aligned in the same horizontal plane (as positioned in FIG. 5) to accommodate a flat or planar component to enter the respective guides 186 for a secure grip or graph of the component 14 by end effector 10 in all three coordinate directions X, Y and Z. It has been found that use of the rollers 190 and 200 with the finger design 80, are particularly useful to prevent a component 14 from laterally sliding through the rollers (in a direction parallel to the roller axis of rotation). The second arm 40 finger 80 may also have a guide 186 positioned in the same plane to accommodate and compliment the other two fingers as shown, for example for a flat component 14.

It is understood that the vertical position of the guides 186 along the plates 170 and 176 can vary and be different in number and configuration to suit the particular application and component 14 to be engaged and manipulated. For example, if a component 14 has a bend in a vertical or Z-direction between the first portion 60 finger and second portion 66 finger, the finger 80 itself may be positioned to locate a guide 186 at the proper plane to receive and engage the component as described above. However, an object of the present invention is for the fingers 80 to accommodate a great variety of different components and geometries without having to change or customize the end effector 10, arms 20 and 30, or fingers 80. For example, as shown in FIGS. 5 and 8, fingers 80 have a plurality of guides 186 along the plates 170, 176. Additional sets of rollers 190 and 200 can be pre-installed on each finger 80 in adjacent guides 186 in the manner described for alternate component engagement points built-in to the fingers.

Figure 12A:
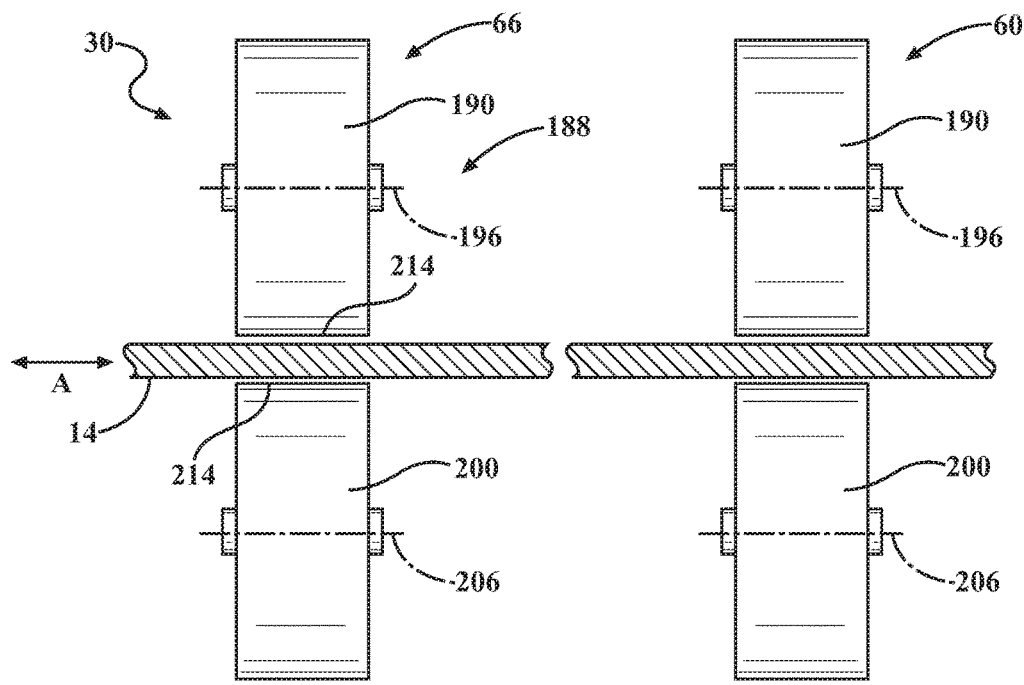
FIGS. 12 A-D show different forms of example finger rollers on the first arm gripping an exemplary component.
Figure 12B:
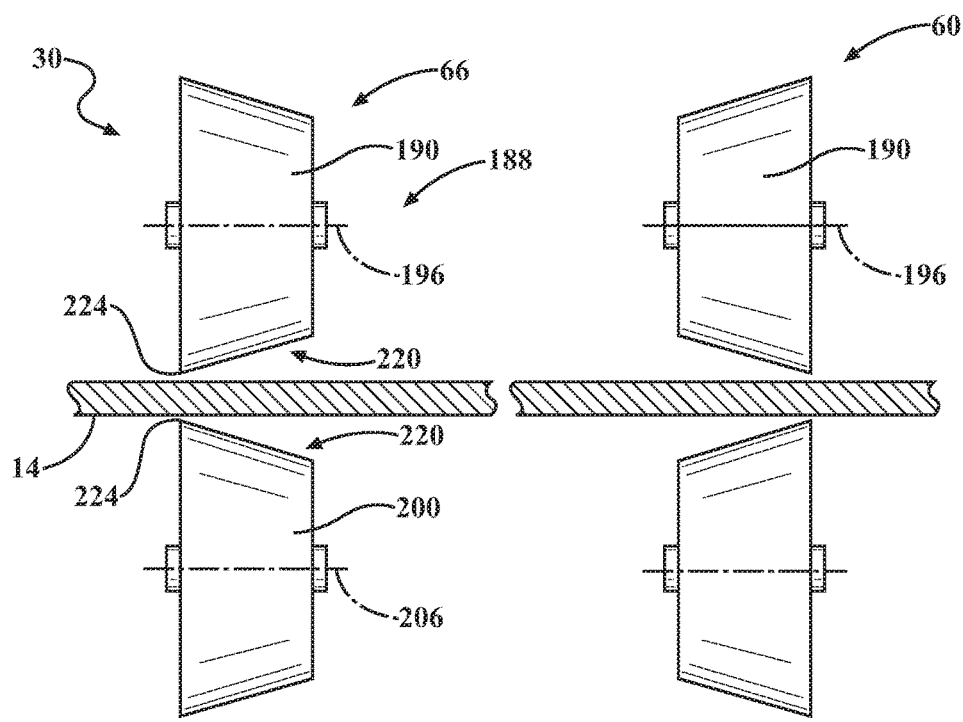
Figure 12C:
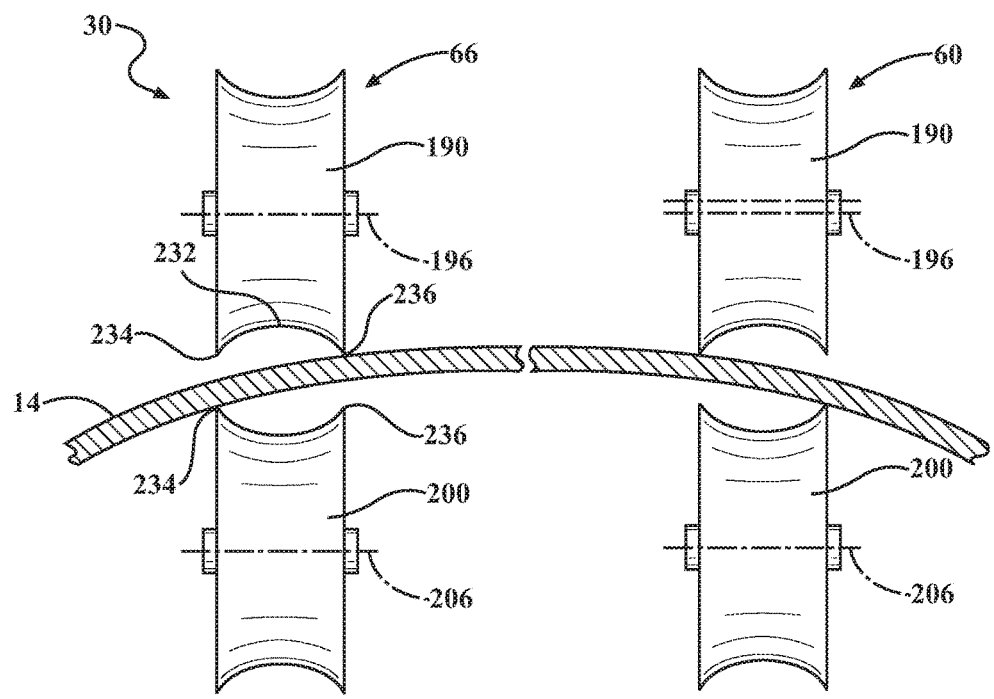
Figure 12D:
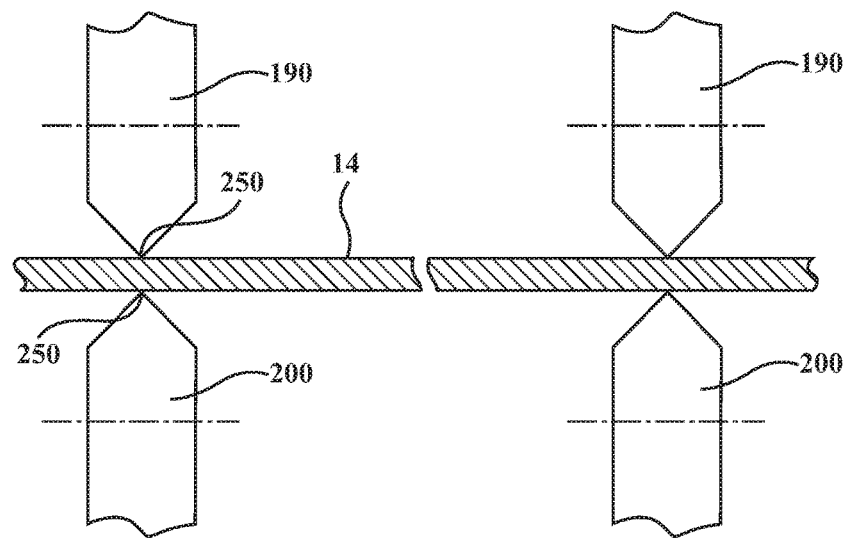

Referring to FIGS. 8, 10, 11, 13, 14 and 15, each finger 80 includes a gripping tool 188 on both sides of the finger 80 so the end effector can perform grasping operations on the exterior perimeter or interior perimeter/feature of a component 14. The exemplary fingers 80 shown in FIGS. 12A-D show alternate gripping tool 188, and exemplary roller 190 and 200, edge designs and configurations (any spaces shown between gripping tool 188 and component 14 are for ease of illustration only). FIG. 12A shows rollers having a flat edge 214 or perimeter. FIG. 12B illustrates a chisel or single bevel edge 220 having an edge 224. FIG. 12C illustrates a double outer edge design with a concave portion or groove 232 having a first edge 234 and a second edge 236. FIG. 12D shows a double-bevel edge design having an edge 250. The use of these alternate roller designs in fingers 80, and use of multiple alternate roller sets in a single or set of fingers (3 total fingers 80 in the illustrated examples although more or less can be used), provide increased flexibility for the end effector 10 to accommodate a high level of varieties of components, component geometries and assembly processes wherein conventional end effectors were typically limited to one or very few components before having to be modified or changed altogether. It is understood that other rollers and blade and configurations, and the number of rollers and blades used, can vary depending on the application and performance known by those skilled in the art can be used without departing from the present invention. It is further understood that the first 30 and second 40 arms may take different configurations, for example one of the arms 20 or 30 may be a different length than the opposing arm and may be of a different structure and configuration as the opposing arm to suit the particular application and components 14. Although fingers 80 and gripper tools 188 have been described for relatively thin sheet metal, it is understood gripping tools 188 can take any form to suit the particular application. For example gripping tools 188 may be elastomeric pads to frictionally engage large planar surfaces of a component 14. Other gripping tool devices, configurations and materials may be used to suit the particular application as known by those skilled in the art.

It has been found that use of flat (FIG. 12A) or edged (FIGS. 12B-D) rollers as illustrated provide increased engagement or holding power with materials, for example sheet metal components. Similar beneficial results have been found with the blade 260 and 284 designs. The rollers 190/200 and blades 260 and 284 have shown increased ability on engagement with component 14 to frictionally engage or "bite" into the component 14 material through very small indentations or elastic or plastic deformation of the component 14 material preventing the component 14 from laterally sliding along a direction A in FIG. 12A through or relative to the fingers/gripping tool 188 in a direction generally parallel to the rollers axes of rotation 196/206 (or blade 260/284 not shown). Any lateral relative movement of the component 14 and end effector 10 can be detrimental in precision manufacturing processes, for example a robot 16 placing a component 14 on an assembly fixture for precision welding or other processes.

In one example not shown, end effector 10 includes a camera or other vision system to image or otherwise detect and/or recognize component 14 before, during and after engagement with end effector 10 through fingers 80. In one example and method, an imaging device, for example a digital camera or video camera is connected to end effector 10, for example housing 26, having a field of vision in the area of fingers 80 or a predetermined location relative to the housing 26 or fingers 80. In one example, as robot 16 moves end effector 10 into the predetermined location of a component 14 to be grasped or otherwise moved, the imaging system lens would capture an image of the component 14 prior to the fingers 80 grasping the component 14. In one example, this image data would be sent to the end effector control unit 110 for comparison to previously stored image data for a variety of components 14. For example, if the component 14 imaged and recognized is not the component end effector 10 is set or programmed to grasp, a warning or other alarm may be issued by control unit 110 to alert a broader control system or operator.

Alternately, and depending on the sophistication of the end effector 10 and control unit 110, the imaged component 14 will be recognized by the control unit 110 and the proper previously stored in memory end effector program and executable instructions will be identified, accessed and executed to set the end effector 10 to the appropriate settings and actions to grasp or otherwise move the imaged and recognized component 14 in the manners described herein. This ensures that end effector 10, moveable second arm 40 and finger 80 are moved the proper amount so as to properly grasp and hold the imaged component 14 for secure and efficient assembly processing.

In an alternate example, the imaging system may be used to verify that a component 14 has been grasped by end effector 10. For example, following movement of the second arm 40 to its predetermined position to grasp component 14, an image may be captured to verify that the end effector 10 has actually grasped and is holding the component 14. This captured image data may be analyzed or compared to data or checks stored in control unit 110 memory and processed by the internal processor to provide the necessary assurance that a part has been properly grasped or some other predetermined condition or characteristic. Other part verification steps or processes known by those skilled in the art may be used.

Alternately, the imaging system may further capture an image when the end effector 10 has completed the predetermined process, for example disengaging with component 14 in an assembly fixture. For example, at a time of the process when second arm 40 has moved and fingers 80 have disengaged the component 14, a visual image can be taken to ensure the component 14 is no longer engaged with fingers 80. This would allow the end effector system 10 to alert a broader control system or an operator that a component is, for example, stuck or hung up on one or more fingers and attention is needed before the next assembly cycle.

It is understood that the described vision system may be used for other purposes and at different points in the end effector 10's cycle of movement or process as known by those skilled in the art. It is further understood that instead of single capture images, that a continuous or video imaging system is used for continuous or semi-continuous monitoring as described. It is also understood that other sensory systems other than vision, for example laser, infrared and other wave or energy sensing systems, may be used to carry out the described verification or safety checks or processes. As previously described, other devices and systems may be used for verification that the end effector 10 and fingers 80, or arms 30 or 40, are properly positioned and have grasped or released a component 14. For example, force sensors may be used in the fingers and/or gripping tools 188, to sense contact, force or pressure indicating engagement (or disengagement) with a component 14. These sensors (not shown) can, for example communicate, wirelessly or through data cables, with the controller 110 or a central controller in an assembly facility, to monitor on a selected or continuous basis, the status of the end effector 10 to ensure the process is operating as intended and to collect process data for an individual assembly station or an entire assembly line.

In a general example of a method for using the flexible end effector 10, the flexible end effector 10 is positioned in proximity to a component by a device, for example a multi-axis programmable robot (16). The flexible end effector 10 may direct the robot through end effector onboard programming and executable instructions to the robot, or the robot may have its own programming and executable instructions and work semi-independently and in coordination with the end effector 10.

When the adaptable end effector 10 is in position to grasp component 14, preferably second arm 40 is actuated to move along a path of travel 154 relative (toward or away from depending on the application) to first arm 30. In a preferred example, component 14 is engaged by each finger 80 through direct engagement of component 14 by a gripping tool 188 positioned in each of fingers 80 as generally described. In a preferred method, relative lateral movement of component 14 relative to the gripping tool 188 is prevented or substantially eliminated on engagement of component 14 by gripping tool 188/fingers 80. External and/or internal sensors (not shown) in communication with the end effector control unit 110 may detect and/or alert that component 14 has been grasped and secured by the fingers 80.

In an example operation, the component 14 is manipulated, reoriented and/or transferred to a different three-dimensional coordinate position as predetermined. The flexible end effector 10 then disengages from the component 14 through movement of second arm 40 relative to first arm 30. Internal or externally positioned sensors or vision systems may detect or alert whether the component has successfully disengaged component 14 so a subsequent grasp and manipulate cycle can begin. Additional and alternate method steps and sequence of steps of flexible end effector 10 may be used as known by those skilled in the art.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An adaptable end effector for use in grasping a component in a robotic assembly operation, the adaptable end effector comprising:
    a housing connected to a robot, the housing having an interior space;
    a base plate at least partially positioned in the housing interior space;
    a first arm connected to the base plate extending away from the base plate, the first arm including a first portion and a second portion positioned at a first distance from the first portion;
    a second arm connected to the base plate and positioned at a second distance from the first arm, the first distance perpendicular to the second distance, the second arm positioned along the first distance between the first arm first portion and the second portion, a portion of the second arm extending through the housing;
    an independent gripping tool connected to each of the first arm first portion, the first arm second portion and the second arm, each gripping tool defining a guide opening having angularly diverging first and second edge portions operable to engage a component positioned in the guide opening; and
    a drive device positioned within the housing interior space and connected to the base plate and one of the first or the second arm for selected movement of the first or the second arm relative the other of the first or the second arm along a path of travel, the drive device operable to selectively rotate the one of the first or the second arm about an axis of rotation relative to the other of the first or the second arm connected to the drive device to engage the component with the first arm and the second arm gripping tool first and second edge portions.

2. The end effector of claim 1 wherein the drive device is connected to the second arm and the first arm is fixed in position relative to the second arm.

3. The end effector of claim 2 further comprising:
    a memory storage device positioned in the housing operable to store predetermined rotational angular movement limit instructions of the second arm relative to the first arm based on the specific component to be engaged by the end effector;
    a control unit in communication with the data memory storage device and the drive device, the control unit operable to selectively energize the drive device and rotationally move the second arm relative to the first arm based on the stored in memory predetermined angular movement limit instructions specific to the component to be engaged by the end effector.

4. The end effector of claim 3 further comprising an imaging sensor in communication with the control unit, the imaging sensor operable to capture an image of the component intended to be engaged by the end effector and the control unit operable to compare stored in memory image data for a plurality of different components, wherein on identifying in memory the imaged component, the stored in memory predetermined rotational angular movement limit instructions of the second arm relative to the first arm for the imaged component is retrieved from memory and executed by the control unit.

5. The end effector of claim 4 wherein the imaging sensor captured image is operable to validate one of the end effector has engaged a component or the end effector has released the component.

6. The end effector of claim 4 wherein the imaging sensor is operable to adjust a robot path of travel.

7. The end effector of claim 2 further comprising:
an armature connected to the drive device and the second arm for selected rotation of the second arm about the axis of rotation; and
a stop connected to the base, the stop having an angled surface operable to limit the rotation of the second arm about the axis of rotation on abutting engagement of the second arm with the stop angled surface.

8. The end effector of claim 1 wherein the gripping tool comprises a first end and a second end opposite the first end, each gripping tool having the guide opening and the angularly diverging first and second edge portions, one of the gripping tool first and the second ends selectively operable to engage the component on rotation of the one of the first arm or the second arm relative to the other of the first arm or the second arm.

9. The end effector of claim 1 wherein the first arm first and second portion and the second arm each further comprise:
a finger connected to and extending from the respective first arm first and second portion and the second arm; and
the gripping tool connected to the respective finger operable to engage a portion of a component with the gripping tool first edge portion and the second edge portion.

10. The end effector of claim 9 wherein the finger further comprises:
a first plate positioned on one side of the gripping tool;
a second plate positioned on a second side of the gripping tool, the gripping tool connected to the first and the second plates.

11. The end effector of claim 9 wherein each finger comprises a plurality of gripping tools separately positioned along a length of the finger, the plurality of gripping tools operable for engagement of a plurality of differently configured components.

12. The end effector of claim 1 wherein the first arm is positioned on an exterior of the housing and is connected to the base plate by a breakaway fastener having a predetermined fracture force operable to separate the first arm from the base plate prior to substantial damage to the first arm or housing.

13. A method of engaging a component with an adaptable end effector for use in a robotic assembly operation, the method comprising the steps of:
storing in a data memory storage device data for a plurality of different components intended to be engaged by an adaptable end effector having a first arm and a second arm, the data for each of the plurality of components including a predetermined rotational angle of travel for the second arm relative to the first arm based specific for each component;
identifying a component intended to be engaged by the adaptable end effector;
selecting from the stored in memory predetermined rotational angle of travel for the second arm for the identified component intended to be engaged by the adaptable end effector;
positioning by a robot the adaptable end effector at a predetermined position relative to the identified component;
energizing through a control unit a drive device connected to the second arm;
rotating the second end arm about an axis of rotation the stored in memory predetermined rotational angle of travel for the identified component; and
engaging the identified component with an independent gripping tool connected to each of the first arm and the second arm.

14. The method of claim 13 wherein the gripping tool comprises a pair of rollers connected to a finger engaged with a respective first or second arm, the method comprises:
forcing pinching engagement of the component between the pair of rollers by rotational movement of the second arm relative to the first arm according to the predetermined rotational angle of travel for the identified component.

15. The method of claim 13 wherein the step of storing in a data memory storage device comprises storing the data in a data memory storage device positioned in a housing defining an interior space in the adaptable end effector, the data memory storage device in communication with a control unit positioned in the adaptable end effector housing interior space.

16. The method of claim 13 wherein the step of identifying a component intended to be engaged by the adaptable end effector further comprises:
capturing an image by an image sensor the component intended to be engaged by the adaptable end effector prior to engaging the component; and
comparing the captured image to the stored in memory plurality of different components intended to be engaged by the adaptable end effector.

17. The method of claim 13 wherein the step of engaging the component with a gripping tool further comprises the step of:
positioning the component between and engaging a gripping tool angularly diverging first edge portion and a second edge portion.

* * * * *